UNITED STATES PATENT OFFICE.

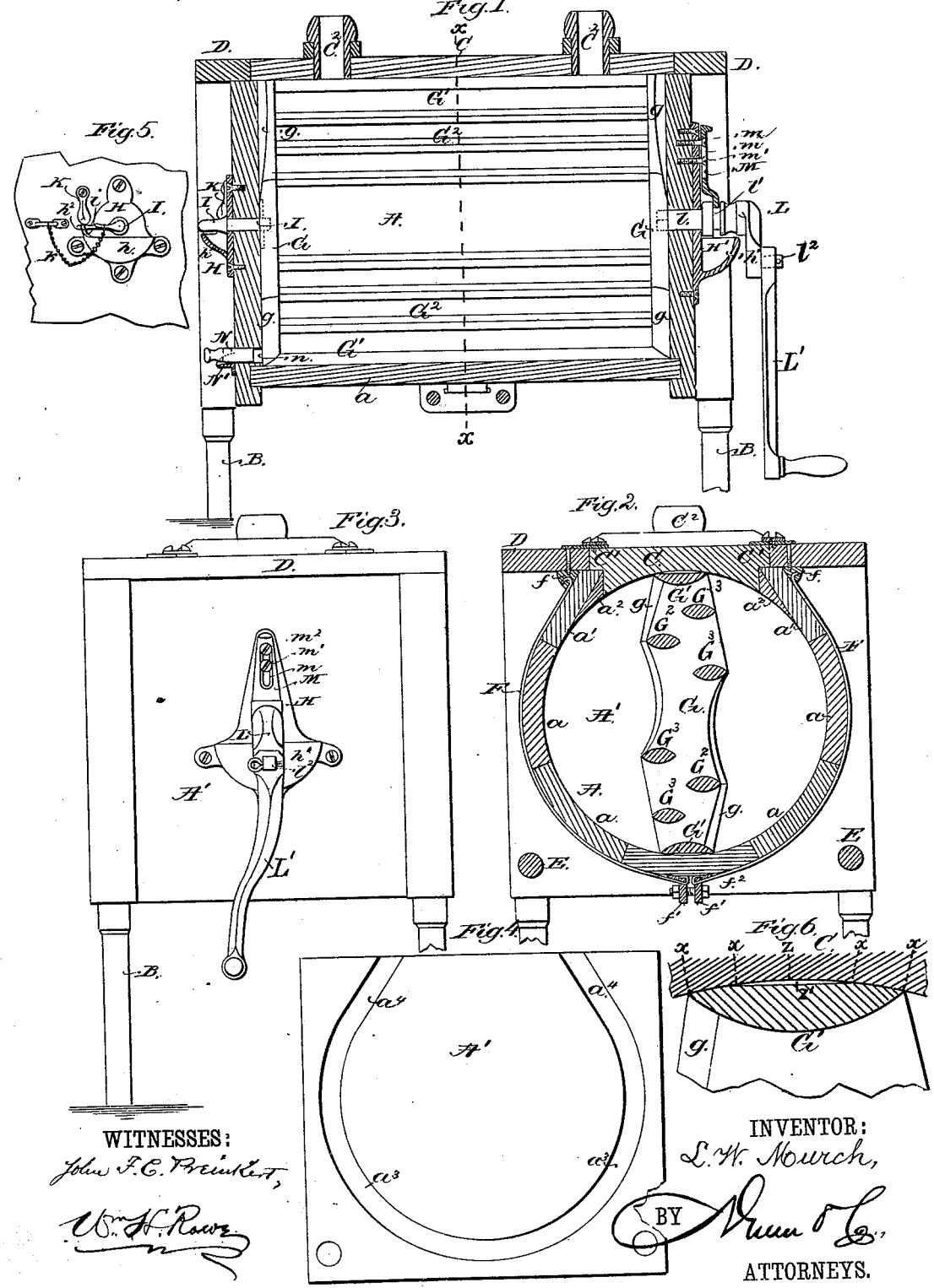

LEWIS W. MURCH, OF KENNEDY, NEW YORK.

ROTARY CHURN.

SPECIFICATION forming part of Letters Patent No. 233,272, dated October 12, 1880.

Application filed June 16, 1880. (No model.)

*To all whom it may concern:*

Be it known that I, LEWIS W. MURCH, of Kennedy, in the county of Chautauqua and State of New York, have invented a new and Improved Rotary Churn; and I do hereby declare that the following is a full, clear, and exact description of the same.

The object of the first part of my invention is to form the cylindrical body of a rotary churn in such manner that its inner surface will be continuous or unbroken, and employ in connection therewith a dasher provided with blades that will bear closely against the inner surface of the churn-body and clear it of adhering cream.

The object of the second part of my invention is to provide a rotary churn with a dasher of peculiar construction, whereby the entire body of cream is equally acted upon by the dasher-blades, so that they will cut through the cream and give to it an undulating or wave-like motion to thoroughly agitate it without mashing or breaking the globules by concussion.

The object of the third part of my invention is to construct a churn in such manner that the entire body of cream will be churned alike, and in which the dasher will be so formed and fitted to the churn-body that the entire inner surface of the churn will be scraped clean at each revolution, and the adhering cream will be returned to the moving mass, and the entire body of cream will be converted into butter, which will effectually prevent the formation of white streaks and caps in the butter.

The object of the fourth part of my invention is to provide a rotary churn with an improved means for ventilating the cream at regular intervals while being churned, a limited quantity of air being drawn into the body of the cream at each revolution of the dash.

The object of the fifth part of my invention is to provide a bearing-plate which will have connected with it a stud-pin provided with a crank or arm upon its other end, a pivoted latch that bears against the outer end of the crank to hold it in place and prevent its accidental withdrawal, and will admit of the ready removal or replacement of the dash.

In the accompanying drawings, Figure 1 is a longitudinal central section through a churn constructed according to my invention; Fig. 2, transverse section of the same in the line $x$ $x$ of Fig. 1; Fig. 3, an end elevation of the churn, showing the adjustable crank; Fig. 4, an elevation, in detail, of one of the end pieces; Fig. 5, an elevation, in detail, of the drip-cup, stud-pin, and pivoted latch to hold the end of the dash and admit of its removal, and Fig. 6 a sectional detail of the outer dasher-stretcher.

The body of the churn is formed of a cylindrical shell, A, secured to end pieces, A', in a peculiar manner and supported upon legs B, to hold the cylindrical shell in a horizontal position. The shell A is formed of a series of staves, $a$ $a$, placed alongside of each other edge to edge, and terminated by shoulder-pieces $a'$ $a'$. The end pieces, A', are formed with a circular recess, $a^3$, in their faces of a radius equal to the radius of the cylindrical shell, into which the ends of the staves and shoulder-pieces are snugly fitted. The upper portion of the recess $a^4$ leaves its circular course in a tangential line and runs into the upper edge of the end piece in order that it may strictly conform to the position and shape of the ends of the shoulder-pieces. The shoulder-pieces $a'$ are formed with a shoulder, $a^2$, that rests against the plain face of the end piece and serves to extend the inner surface of the stave to form a continuation of the circular curve of the inner surface and connect the walls of the cylinder in an unbroken surface with the under surface of a cover, C, that fits snugly between the shoulder-pieces and the end pieces of the shell-casing. A cap-piece, D, to the casing is formed of a rectangular piece of wood of equal thickness throughout, that extends to the outer edges of the casing, and is provided with a central rectangular opening that will fit around the inner edges of the end pieces and shoulder-pieces, to leave a small shoulder upon all sides around it, to closely embrace the cap-piece C' of the cover and form a ledge upon which it may rest. The cap-piece D also serves to connect the legs B of the churn above the cylindrical shell, and braces or rounds E also serve to connect the said parts below the cylindrical shell, so that a strong and durable structure is obtained in a simple manner.

The staves of the churn are closely bound together midway of their length by means of metal straps F F, secured at their upper ends to metal plates $f f$, a shoulder upon each of which is firmly clamped between the cap-piece D and the shoulder-pieces $a'$ of the shell, and the lower or meeting ends of which are connected to plates $f' f'$, that are clamped together by set-screws $f^2$, by which means the straps F F may be tightly drawn around the staves and clamped together. This arrangement will provide means for drawing the staves more closely together at their meeting edges or joints, if they should warp and spring at such points, so that the shell may at all times be kept perfectly tight and the size of its inner diameter remain constant, which is an important feature in connection with a peculiarly-formed rotary dasher, hereinafter described, to keep the cream from adhering to the inner surface of the cylindrical shell.

The dasher is formed of end pieces, G, connected by stretchers $G'$, $G^2$, and $G^3$, eight of which are employed in this instance, and are firmly connected together to form a shaftless rotary dasher, suspended at the middle part of the end pieces, G, by means of a short journal, $l$, upon the crank L at one end, and a stud-pin, I, at the other, each of which passes through metal plates in the end pieces, A, of the frames, and form journals upon which the dasher may revolve. The outer stretchers, $G'$, of the dasher are formed with convex inner surfaces, the outer surface being flattened at its middle portion and made convex at their outer portion or edges, as shown in Fig. 6, so that the edges of the outer surface will accurately conform to and bear closely against the inner cylindrical surface of the shell between the lines $x\, x$, and the flattened upper surface, $z$, will form a chord thereto, by which means a space, $z'$, is always left between the outer surface of the stretchers and the inner surface of the shell.

The cover C is perforated at its ends, and is provided with small tubular cups $C^2$, that pass through cross-cleats on the cover and allow air to pass to the interior of the churn to be mixed with the cream and aid the process of butter-making in a well-known manner. The cross-cleats serve a good purpose to prevent the cover from warping and breaking the continuous cylindrical inner surface of the churn-body.

The air is drawn into the churn through the perforation of the cover by the suction of the inclosed space $z'$ above the stretcher $G'$, caused by the revolution of the dasher, and is carried around with the dasher, by means of the closely-fitting edges of the stretchers $G'$, beneath the cream, and allowed to slowly escape and freely percolate upward through the body of the cream to perform its office in the separation of the globules of butter from the milk.

The inner stretchers, $G^2\, G^3$, are formed with double-convex sides, which meet to form cutting-edges, and are arranged upon the end pieces so that they will be arranged in baffle-board relation to each other. The two forward stretchers, $G^3$, will first pass through the cream and divide it into currents, which will be again separated by the follower-stretchers $G^2$, the joint action of which will cause the cream to circulate in curved or wave lines around the double-convex stretchers, by which means the cream will be thoroughly agitated and subjected to complete molecular disturbance. By this means it will be readily seen that while the cream is subjected to the most thorough agitation, it is not whipped or beaten by contact with blunt or flat surfaces, which would mash and break the butter-globules by their concussion with the dasher. The cylindrical body of the churn will only be filled to its axial line with cream, so that its entire body will be equally subjected to the action of the dasher.

The end pieces, G, of the dasher are formed with feathered or knife edges $g$, which bear closely against the inner face of the end pieces, $A'$, of the churn-body, and completely scrape from them any cream that may adhere to their surface.

The end pieces are beveled in opposite directions upon their opposite ends, so that the forward edge of the end piece will be the scraping or knife edge upon each side of the journal of the dasher. By this means, together with the scraping action of the outer stretchers, $G'$, against the inner face of the cylinder, the entire body of cream is at all times acted upon equally, and the walls of the churn are not allowed to retain a body of cream that will be operated upon by the dasher unequally with the main body of cream, and be subsequently mixed with and form white streaks and caps in the butter. Each of the end pieces is provided with a metal plate, H H', secured to its outer side by means of wood-screws, and is provided with a cup or basin, $h\, h'$, arranged directly beneath the openings through which the stud-journal of a crank-handle passes through an end piece, and a stud-pin, I, also provided with a crank-shaped end, $i$, passes through the other end piece. The basin $h$ of plate H, through which the pin I passes, is formed with a notch, $h^2$, in its rim, into which the crank end $i$ of the pin I passes, and is closely held by means of a latch, K, pivoted to the end piece of the casing. A chain, $k$, connects a loop in the end of pin I with a staple upon the end piece, by which means it is always held within convenient reach when not in place. The metal plate H' forms a bearing for the journal $l$ of a short crank, L, that is held in place upon the plate H' by means of a vertically-moving clutch-plate, M, the prongs of which embrace the shaft $l$ and fit snugly in a groove, $l'$, in the said shaft. The plate M is held in place upon the plate H', and made adjustable thereon by means of a slot, $m$, in the plate and set-screws $m'\, m^2$. The pin I passes through a bushed bearing in one of the end pieces of the dasher, and the inner end of the crank L is flattened and fits snugly in a rectangular hole in the metal plate upon the other end piece of the dasher, so that by turning the crank the dasher may be revolved. A rectangular hole and flattened end of the shaft is preferred, because it will not so readily wear into a round hole as where a perfect square connection is made. The outer end of the crank L is provided with a square-sided crank-pin, $l^2$, upon which an ordinary crank-arm, L′, provided with a square opening to fit the pin, may be fitted in any one of four positions by changing the crank so that any one of the square sides of the opening will come opposite any one of the sides of the pin.

The buttermilk is allowed to escape from the churn through an opening, $n$, by withdrawing plug N, and a metal spout, N′, delivers it from the said opening.

What I claim as new is—

1. In a rotary churn, the body formed of end pieces, A′, to receive staves $a\, a'$, that are arranged, together with the cover C, to form an unbroken cylindrical inner surface, and a rotary dasher formed of end pieces, G, connected together by stretchers G′, the outer edges of which are in contact with and scrape the unbroken cylindrical inner surface of the churn-body, substantially as and for the purpose described.

2. In a churn-dasher, the combination of the end pieces, G G, connected by stretchers $G^2\, G^3$, formed with double-convex sides, and arranged in a baffle-board relation to each other, so that the stretchers $G^2$ will follow in a path midway of the paths of the stretchers $G^3$, to impart to the cream an undulating or wavelike motion, substantially as described.

3. The combination, in a churn having a horizontal cylindrical body, of a dasher formed of end pieces having their faces beveled to form feather-edges, that bear against the faces of the ends of the churn to clear them of cream, the end pieces being connected together by stretchers, the outer ones of which will scrape the cylindrical surface of the churn-body, substantially as and for the purpose described.

4. The combination, in a churn having a cylindrical body, of a cover forming a segment of such cylinder, and provided with openings communicating with the outer air, and a dasher formed of double-convex shaped end pieces connected by stretchers, one of the faces of which are flattened to fit snugly the interior of the churn-body, and provide an inclosed air-space between the outer convex surfaces of the dasher and the inner surface of the churn, substantially as and for the purpose described.

5. The metal bearing-plate H, provided with a bowl having a notch, $h^2$, in its rim, the stud-pin I, provided with a cranked end that engages with the notch of the rim, and a pivoted latch-piece, K, that holds the pin in place, substantially as described.

L. W. MURCH.

Witnesses:
SOLON C. KEMON,
CHAS. A. PETTIT.